(12) United States Patent
Lee et al.

(10) Patent No.: US 11,794,620 B2
(45) Date of Patent: Oct. 24, 2023

(54) ARMREST

(71) Applicants: Hyundai Motor Company, Seoul (KR); Kia Corporation, Seoul (KR); DAE WON SAN UP CO., LTD, Gyeonggi-do (KR)

(72) Inventors: Hong Heui Lee, Gyeonggi-do (KR); Myung Hoe Kim, Seoul (KR); Eun Sue Kim, Gyeonggi-do (KR); Seung Sik Han, Gyeonggi-Do (KR); Dong Hwi Kim, Gyeonggi-do (KR); Sang Yong Koo, Incheon (KR); Sun Ho Hur, Seoul (KR)

(73) Assignees: Hyundai Motor Company, Seoul (KR); Kia Corporation, Seoul (KR); Dae Won San Up Co., Ltd, Gyeonggi-do (KR)

( * ) Notice: Subject to any disclaimer, the term of this patent is extended or adjusted under 35 U.S.C. 154(b) by 0 days.

(21) Appl. No.: 17/731,990

(22) Filed: Apr. 28, 2022

(65) Prior Publication Data

US 2023/0091680 A1 Mar. 23, 2023

(30) Foreign Application Priority Data

Sep. 23, 2021 (KR) .......................... 10-2021-0125668

(51) Int. Cl.
*B60N 2/70* (2006.01)
*B60N 2/75* (2018.01)

(52) U.S. Cl.
CPC .................................. *B60N 2/753* (2018.02)

(58) Field of Classification Search
CPC ....... A47C 1/03; A47C 1/0303; A47C 1/0305; A47C 1/0307; A47C 1/0308; A47C 7/541; B60N 2/753; B60N 2/763; B60N 2/75; B60N 2/79
USPC ...................................................... 297/411.32
See application file for complete search history.

(56) References Cited

U.S. PATENT DOCUMENTS

| | | | |
|---|---|---|---|
| 2018/0208089 A1* | 7/2018 | Harris ..................... | B60N 2/793 |
| 2019/0184875 A1 | 6/2019 | Gomez et al. | |
| 2020/0101880 A1* | 4/2020 | Alexandersson ........ | B60N 2/12 |
| 2020/0247273 A1* | 8/2020 | Heath .................... | B60N 3/063 |

* cited by examiner

*Primary Examiner* — Mark R Wendell
(74) *Attorney, Agent, or Firm* — Fox Rothschild LLP

(57) ABSTRACT

Disclosed is an armrest for a seat, which is accommodated at a lateral side of a seat cushion at a standby position and adjusted in height with respect to the seat cushion at an operation position. The armrest includes: a base disposed adjacent to the seat cushion; a first module rotatably connected to the base and configured to rotate about a first rotation axis so that a height of the first module with respect to the seat cushion is adjusted; and a second module rotatably connected to the first module and configured to rotate about a second rotation axis traversing the first rotation axis so that the second module is disposed horizontally or vertically with respect to the seat cushion.

15 Claims, 14 Drawing Sheets

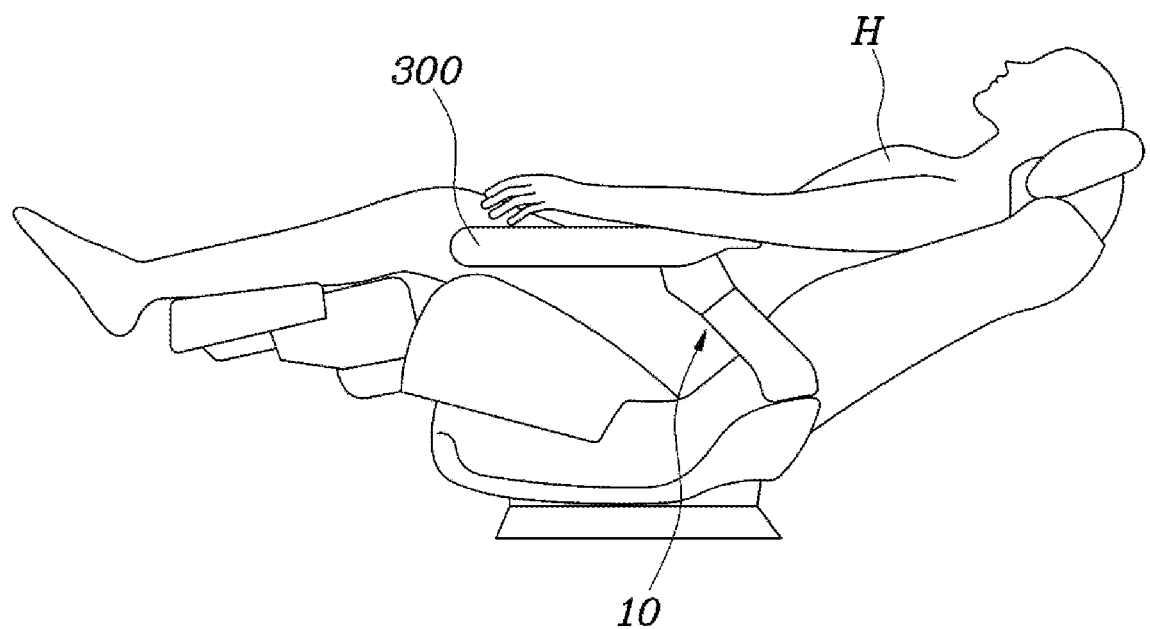
[FIG. 9]

ARMREST

CROSS REFERENCE TO RELATED APPLICATION

The present application claims priority to Korean Patent Application No. 10-2021-0125668, filed Sep. 23, 2021, the entire contents of which is incorporated herein for all purposes by this reference.

TECHNICAL FIELD

The present invention relates to an armrest. The armrest may be accommodated at a lateral side of a seat cushion when an occupant is not seated in a seat and be adjusted in position with respect to the seat when the occupant is seated in the seat.

BACKGROUND OF THE INVENTION

An armrest on which an occupant may place his/her arm is provided on a vehicle seat. A driver or passenger may take a comfortable posture by placing his/her arm on the armrest in a state in which the driver is seated in the seat. In general, armrests may be rotatably installed at two opposite sides of the seat and folded or unfolded.

A position of the armrest needs to be adjusted depending on a body structure of the occupant. In particular, in the case of a rear seat of a van, the armrest may interfere with a movement path through which the occupant gets in or out of the vehicle. The position of the armrest needs to be adjusted when the occupant gets in or out of the vehicle.

In addition, when the seat is folded, the armrest protrudes from a lateral side of the seat, and the armrest occupies a certain space. Therefore, there is a need for a structure in which the armrest is accommodated at a position of the lateral side of the seat so as not to protrude when the armrest is not used.

Meanwhile, recently, there has been an increasing interest in autonomous driving vehicles. The autonomous driving vehicle refers to a vehicle applied with an autonomous driving technology for allowing the vehicle to autonomously move even though the occupant directly manipulates whether to move the vehicle, a movement direction, a movement speed, or the like.

Since the driver need not consistently manipulate the autonomous driving vehicle, the occupants in the autonomous driving vehicle may do various activities in the vehicle. For example, the occupants in the vehicle may have a meeting, enjoy entertainment, or take a sleep. A traditional vehicle seat is directed toward a front side of the vehicle. However, the seats of the autonomous driving vehicle may be freely adjusted in position so that the occupants may face one another. The position of the armrest also needs to be adjusted as the position of the seat is freely adjusted.

In addition, a side airbag (SAB) is provided to be deployed from the lateral side of the vehicle seat. In the case of the autonomous driving vehicle, the side airbag may be embedded in the seat. When various types of sensors in the vehicle detect a collision risk, the side airbag may be deployed from the seat to protect the occupant from impact. Because a space between the armrest and a seatback is narrow, the side airbag may not be sufficiently deployed when the side airbag is deployed to the lateral side of the seat.

Accordingly, to effectively protect the occupant, a space in which the side airbag may be sufficiently deployed needs to be ensured between the armrest and the seatback before the side airbag is deployed.

SUMMARY

In one preferred aspect, provided is an armrest that is completely accommodated at a lateral side of a seat cushion so as not to be exposed to an interior space in a vehicle when the armrest need not be used.

In one preferred aspect, provided is an armrest that is operated in a one-touch manner so that the armrest is positioned at an operation position at which an occupant may use the armrest while manipulating the armrest by means of a controller and a standby position at which the armrest is accommodated.

In one preferred aspect, provided is an armrest that may be freely adjusted in position depending on a body structure or a seating posture of an occupant.

In one preferred aspect, provided is an armrest that is automatically adjusted in position so as not to interrupt deployment of a side airbag when the side airbag operates.

The objects to be achieved by the embodiments are not limited to the above-mentioned objects, and other objects, which are not mentioned above, may be clearly understood by those skilled in the art from the present specification and the accompanying drawings.

In one aspect, provided is an armrest for a seat, which is accommodated at a lateral side of a seat cushion at a standby position and adjusted in height with respect to the seat cushion at an operation position. The armrest includes: a base disposed adjacent to the seat cushion; a first module rotatably connected to the base and configured to rotate about a first rotation axis so that a height of the first module with respect to the seat cushion is adjusted; and a second module rotatably connected to the first module and configured to rotate about a second rotation axis traversing the first rotation axis so that the second module is disposed horizontally or vertically with respect to the seat cushion.

In addition, when the first module rotates about the first rotation axis in one direction, the second module may be rotated about the second rotation axis and disposed horizontally with respect to the seat cushion, and when the first module rotates about the first rotation axis in the other direction, the second module may be rotated about the second rotation axis and disposed vertically with respect to the seat cushion.

In addition, the base may include a first sector gear connected to the first module, in which when the first sector gear rotates about the first rotation axis in one direction, the first module may move so that a height thereof with respect to the seat cushion increases, and in which when the first sector gear rotates about the first rotation axis in the other direction, the first module may move so that the height thereof with respect to the seat cushion decreases.

In addition, the base may include an actuator configured to provide driving power to the first sector gear.

In addition, the first module may include a link unit, one end of the link unit may be connected to the base so as to be rotatable about the first rotation axis and serve as a rotation center, the other end of the link unit may be connected to the second module, and the second module may be connected to the other end of the link unit so as to be rotatable about the second rotation axis.

In addition, the first module may include a second sector gear connected to the second module and configured to operate when the first module rotates, in which the second module may include a pinion gear rotatably connected to the second sector gear, and a rack gear configured to engage with the pinion gear and move forward or rearward relative to the seat, and in which the second module may be rotated about the second rotation axis by the forward or rearward movement of the rack gear.

In addition, the pinion gear may rotate in the other direction when the second sector gear operates in one direction, and the pinion gear may rotate in one direction when the second sector gear operates in the other direction, such that the rack gear may move forward or rearward relative to the seat.

In addition, the rack gear may include a guide pin, in which the second module may include a rotary member into which a part of the rack gear is inserted, the rotary member including a guide groove penetrated by the guide pin from inside to outside, in which at least a part of the guide groove may be curved along an outer peripheral surface of the rotary member, and in which when the rack gear moves forward or rearward, the guide pin may move along the guide groove to rotate the rotary member about the second rotation axis.

In addition, a height of the second module with respect to the seat cushion may be adjusted as the first module rotates relative to the base.

The armrest may further include a controller including: a first operating unit configured to position the armrest at the standby position or the operation position; and a second operating unit configured to adjust a position of the armrest at the operation position.

In addition, the armrest may further include a processor configured to adjust a position of the armrest, in which the processor adjusts the position of the armrest so that the armrest moves forward relative to the seat when an airbag embedded in the seat is deployed.

The processor may adjust the position of the armrest to move the armrest forward relative to the seat when processor receives a collision risk signal, and the processor adjust the position of the armrest to move the armrest to an original position when a side airbag is not deployed after the processor receives the collision risk signal.

The second module may include an upper housing and a lower housing disposed below the upper housing, and the upper housing may be connected to the lower housing so as to be slidable rearward to adjust a position of the second module forward or rearward.

Also provided is a vehicle including the armrest as described herein.

When the armrest according to various exemplary embodiments of the present invention need not be used, the armrest may be completely accommodated at the lateral side of the seat cushion of the vehicle, which makes it possible to ensure the interior space in the vehicle.

In addition, when the occupant touches the controller of the armrest according to various exemplary embodiments of the present invention, the armrest may move to the operation position at which the armrest may be used and the standby position at which the armrest is accommodated, which enables the occupant to conveniently use the armrest.

In addition, the armrest according to various exemplary embodiments of the present invention may be freely adjusted in position depending on the body structure or the seating posture of the occupant, which provides convenience for the occupant.

In addition, when the side airbag operates, the position of the armrest is adjusted to the position at which the armrest does not hinder the deployment of the side airbag, such that the occupant may be sufficiently protected by the side airbag.

The effects of the exemplary embodiments are not limited to the above-mentioned effects, and other effects, which are not mentioned above, may be clearly understood by those skilled in the art from the present specification and the accompanying drawings.

Other aspects of the invention are disclosed infra.

BRIEF DESCRIPTION OF THE DRAWINGS

FIGS. 9, 10A, and 10B show an operation of the armrest according to an exemplary embodiment of the present invention in a relaxing mode of a seat.

DETAILED DESCRIPTION

Figure 1A:
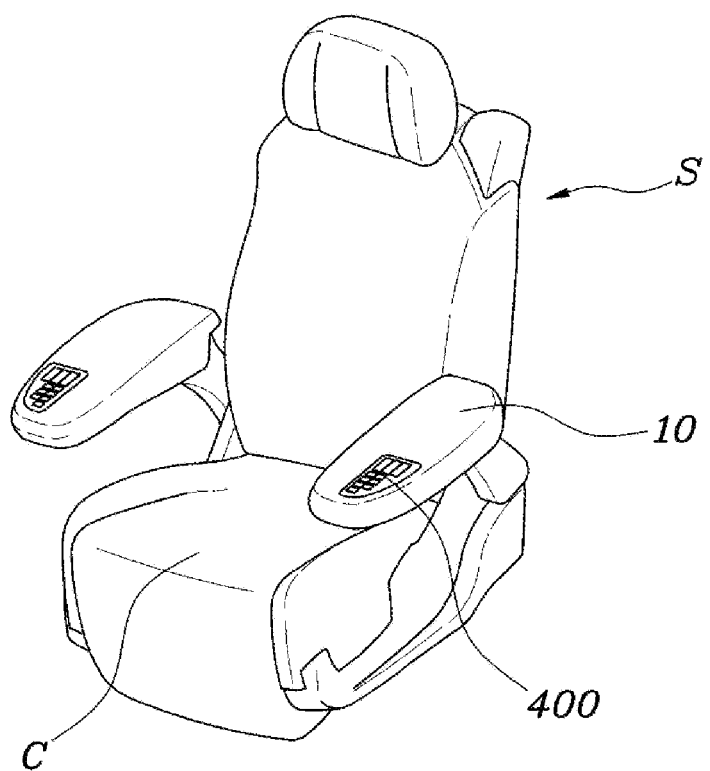
FIG. 1A shows a state in which an exemplary armrest according to an exemplary embodiment of the present invention is positioned at an operation position.

The terms used in the embodiments are selected from general terms currently widely used in the art in consideration of functions in the present invention, but the terms may vary according to the intention of those skilled in the art, precedents, or new technology in the art. Further, specified terms are selected arbitrarily by the applicant, and in this case, the detailed meaning thereof will be described in the detailed description of the present invention. Thus, the terms used in the present invention should be defined based on not simple names but the meaning of the terms and the overall description of the present invention.

Throughout the specification, unless explicitly described to the contrary, the word "comprise/include" and variations such as "comprises/includes" or "comprising/including" will be understood to imply the further inclusion of stated elements but not the exclusion of any other elements. In addition, the term "unit", "part", "module", or the like, which is described in the specification, means a unit that performs at least one function or operation, and the "unit", "part", or the like may be implemented by hardware, software, or a combination of hardware and software.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, the embodiments will be described in detail with reference to the accompanying drawings so that those with ordinary skill in the art to which the embodiments pertain may easily carry out the embodiments. However, the embodiments may be implemented in various different ways, and is not limited to the exemplary embodiments described herein.

Hereinafter, exemplary embodiments will be described in detail with reference to the drawings.

Figure 1B:
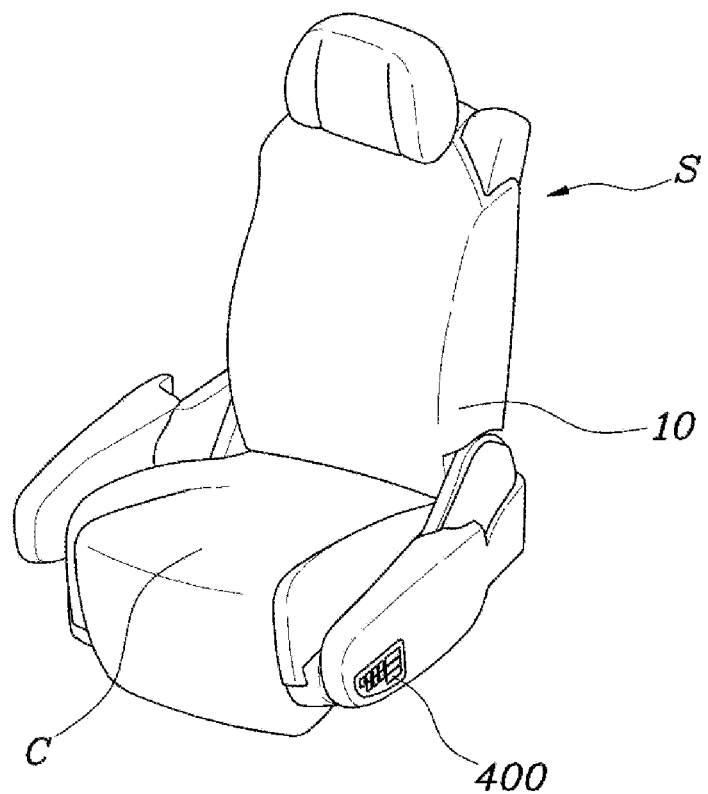
FIG. 1B shows a state in which the armrest according to an exemplary embodiment of the present invention is positioned at a standby position.

FIG. 1A shows a state in which an armrest according to an exemplary embodiment is positioned at an operation position, and FIG. 1B is a view illustrating a state in which the armrest according to an exemplary embodiment of the present invention is positioned at a standby position.

When an occupant is seated in a seat S, armrests 10 need to be positioned at a predetermined height with respect to a seat cushion C to allow the occupant to place his/her two arms on the armrests 10. As shown in FIG. 1A, the armrest 10 according to an exemplary embodiment of the present invention may be disposed at a predetermined height with respect to the seat cushion C at the operation position. The operation position may mean a position at which the armrest 10 is disposed at a predetermined height with respect to the seat cushion C so that the occupant may use the armrest 10. When the armrests 10 are positioned at the operation position, the occupant seated in the seat S may place the two arms on the armrests 10.

As shown in FIG. 1B, the armrest 10 according to an exemplary embodiment of the present invention may be moved downward from a lateral side of the seat cushion C at the standby position and accommodated at the lateral side of the seat cushion C. The standby position may mean a position at which the armrest 10 is accommodated at the lateral side of the seat cushion C and disposed so as not to have a height with respect to the seat cushion C. In other words, when the occupant does not use the armrest 10, the armrest 10 is positioned at the standby position, such that the armrest 10 does not occupy an interior space in the vehicle.

When the occupant is seated in the seat S, the armrests 10 are positioned at the operation position, such that the occupant may place the two arms on the armrests 10. When the armrest 10 is kept positioned at the operation position even though the occupant gets out of the seat S, the armrest 10 may occupy a predetermined space at the front and lateral sides of the seat S. For this reason, the armrest 10 may hinder the occupant from moving between the seats S or loading an article into the vehicle in the space occupied by the armrest 10.

The armrest 10 may be positioned at the standby position when the occupant is not seated in the seat S. Therefore, the occupant may be comfortably seated in the seat S without being hindered by the armrest 10. The occupant completely seated in the seat may move the armrest 10 to the operation position by manipulating a controller 400 provided on the armrest 10. When the occupant touches the controller 400, the armrest 10 may be moved from the operation position to the standby position or from the standby position to the operation position. Therefore, the controller 400 may be operated in a one-touch manner. The detailed description of this configuration will be described below with reference to the drawings.

In particular, when a rear seat in a second row disposed rearward from a first row in which a driver seat and a passenger seat are provided, the armrest 10 may hinder the occupant from getting in or out of the vehicle. In addition, the armrest 10 may hinder the occupant from moving to a third row, or the armrest 10 may restrict a loading space for an article even when the occupant loads the article in the second row or the third row in the vehicle.

The armrest 10 is positioned at the standby position when the occupant is not seated in the seat S, so as to eliminate the discomfort or restriction by maximally ensuring the interior space in the vehicle. The armrest 10 may be basically positioned at the standby position illustrated in FIG. 1B. After the occupant is seated in the seat S, the occupant may move the armrests 10 to the operation position by manipulating the controller 400 and place the two arms on the armrests 10. When the occupant gets out of the seat S, the occupant may return the armrest 10 back to the standby position by manipulating the controller 400. Alternatively, a seating detection sensor (not illustrated) provided in the seat S may detect whether the occupant is seated in the seat S. When the seating detection sensor detects that the occupant is not seated in the seat S for a predetermined time, the armrest 10 may be automatically moved to the standby position.

Figure 2:
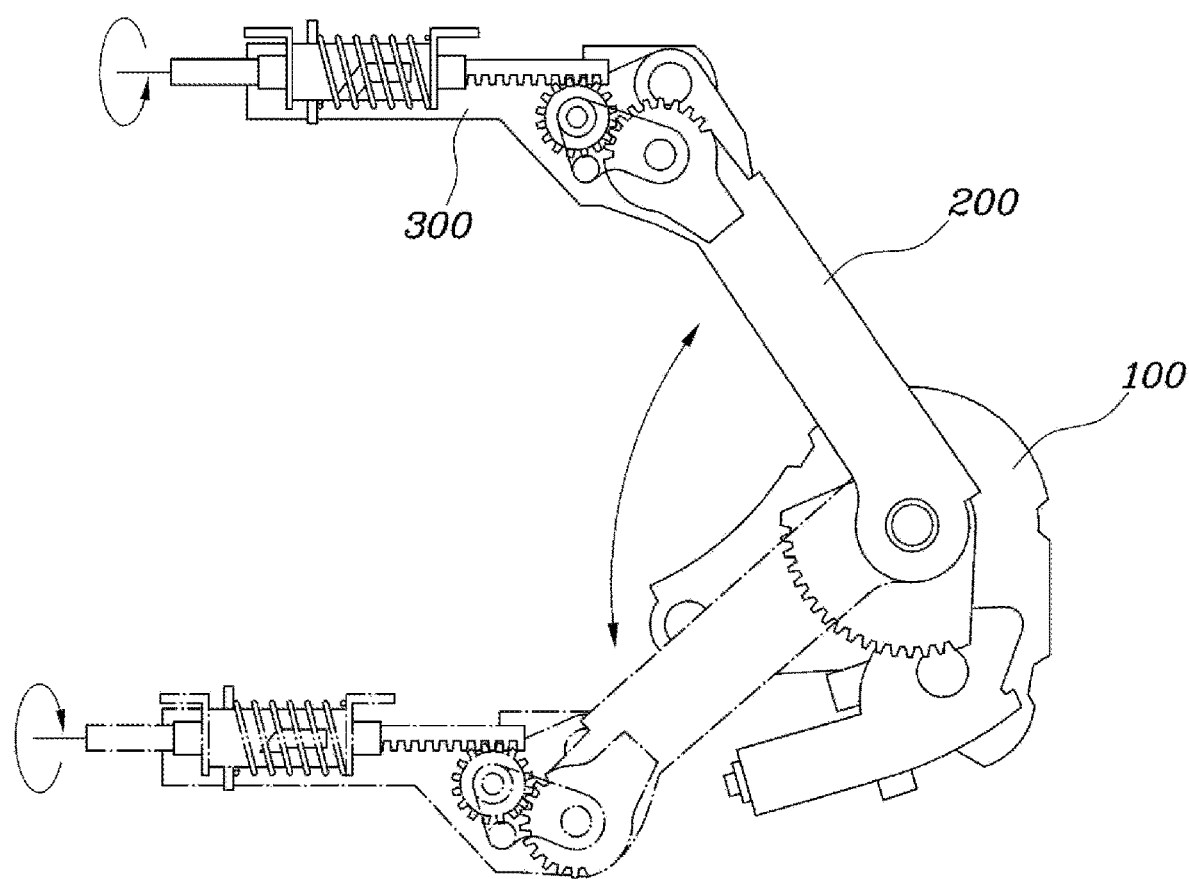
FIG. 2 shows an exemplary operation of the armrest according to an exemplary embodiment of the present invention.

FIG. 2 shows the operation of the armrest according to an exemplary embodiment of the present invention.

As shown in FIG. 2, the armrest 10 may include a base 100 disposed adjacent to the seat cushion C and configured to provide driving power, a first module 200 rotatably connected to the base 100, and a second module 200 rotatably connected to the first module 200. The base 100 may be disposed adjacent to the seat cushion C. For example, the base 100 may be fastened to a lower portion of the lateral side of the seat cushion C. A first rotation axis A1, which is a rotation axis about which the first module 200 rotates, traverses a second rotation axis A2 which is a rotation axis about which the second module 200 rotates. The detailed description of this configuration will be described below.

As shown in FIG. 2, the first module 200 may be rotatably connected to the base 100. One end of the first module 200 may be connected to the base 100, and the second module 200 may be connected to the other end of the first module 200. The base 100 may provide a rotational force to the first module 200. A height of the second module 200 with respect to the seat cushion C may be adjusted as the first module 200 rotates by a predetermined angle with respect to the base 100.

In addition, the second module 200 may rotate as the first module 200 rotates by a predetermined angle with respect to the base 100. When the second module 200 may be rotated and thus disposed horizontally or vertically with respect to the seat cushion C. When the second module 200 is positioned at the operation position, the second module 200 may be disposed horizontally with respect to the seat cushion C. When the second module 200 is positioned at the standby position, the second module 200 may be disposed vertically with respect to the seat cushion C. A cushion may be provided on an outer portion of the second module 200 so that the occupant may place his/her arm on the second module 200.

FIG. 2 shows basic components related to the armrest 10 according to an exemplary embodiment of the present invention. Therefore, those skilled in the technical field related to the present embodiment may understand that the armrest 10 may further include other universal constituent elements in addition to the constituent elements illustrated in FIG. 2. For example, the armrest 10 may further include an elastic member, an outer sheath, a fastening member, a fixing hardware component, a bracket, and the like.

Figure 3A:
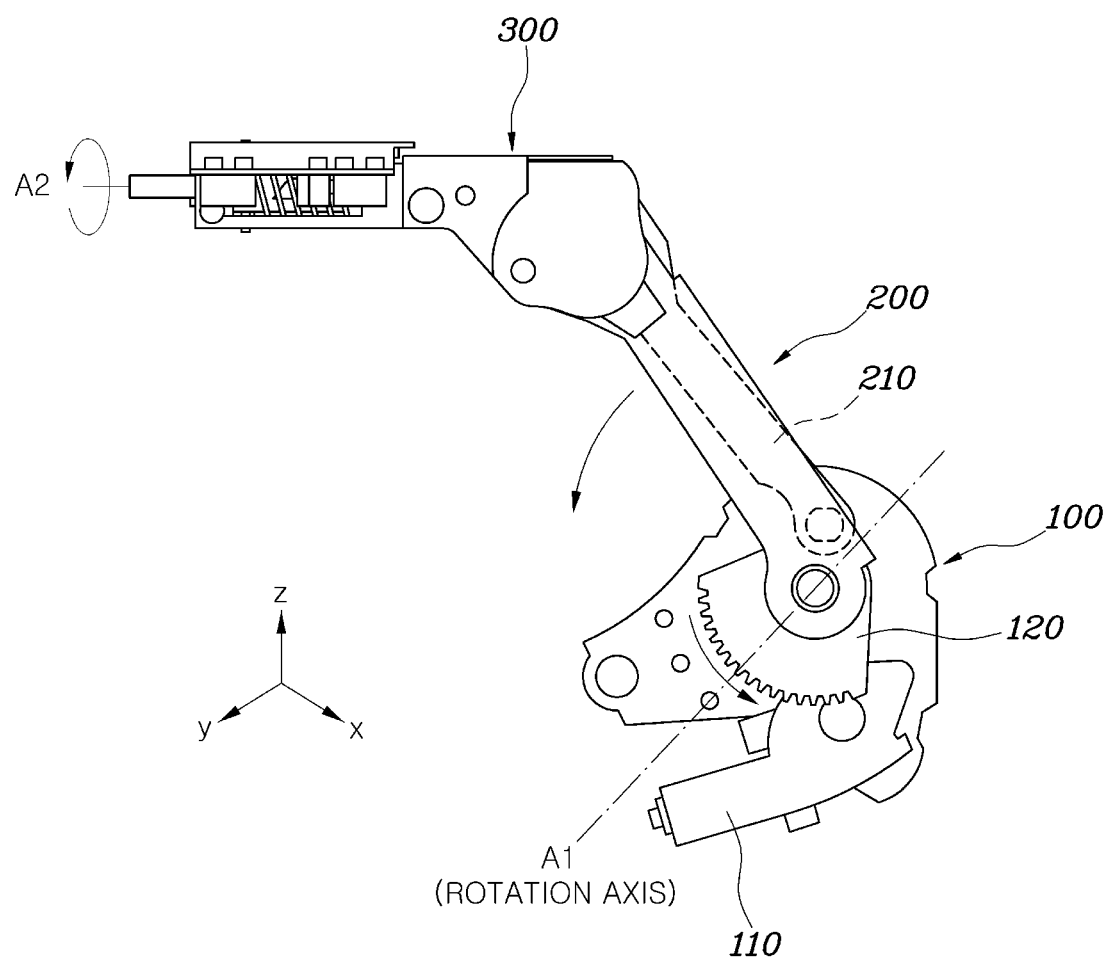
FIGS. 3A and 3B show a state in which a first module of the armrest according to an exemplary embodiment of the present invention rotates.
Figure 3B:
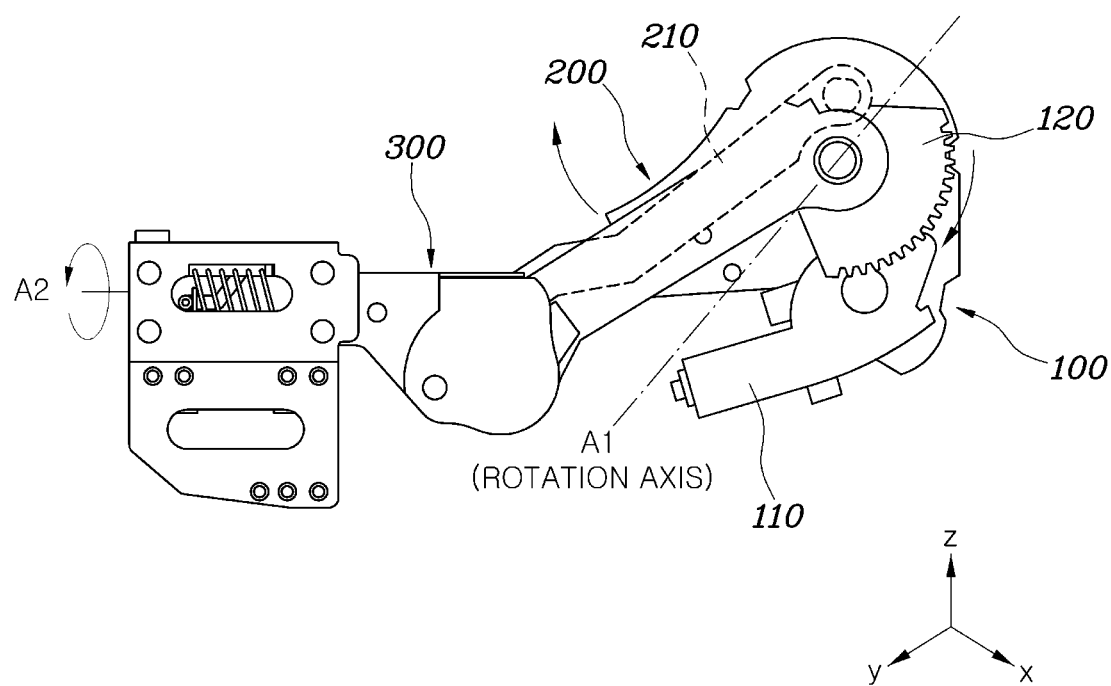

FIGS. 3A and 3B show a state in which the first module of the armrest according to an exemplary embodiment of the present invention rotates.

As shown in FIGS. 3A and 3B, the base 100 may include a first sector gear 120 connected to the first module 200, and an actuator 110 configured to provide driving power to the first sector gear 120. Gear teeth, which engage with a part of the actuator 110, may be provided on at least a part of an outer peripheral surface of the first sector gear 120. The actuator 110 may include an output part that rotates when the actuator 110 receives an electrical signal. The first sector gear 120 may rotate in one direction or the other direction by means of the engagement relationship between the gear teeth and the output part of the actuator 110.

For example, when the occupant intends to move the armrest 10 from the standby position to the operation position, the occupant may touch an operation button of the controller 400, such that the electrical signal may be transmitted to the actuator 110, and the actuator 110 may generate the rotational motion. As the first sector gear 120 is rotated by the actuator 110, the first module 200 connected to the first sector gear 120 may rotate.

In addition, the first module 200 may include a link unit rotatably connected to the base 100. One end of the link unit may be connected to the base 100 so as to be rotatable about the first rotation axis A1. Therefore, when the first sector gear 120 rotates, one end of the link unit connected to the first sector gear 120 may be a rotation center. When the link unit rotates about the one end of the link unit, which is the rotation center, the other end of the link unit may have a predetermined height from the seat cushion C.

The other end of the link unit may be connected to the second module 200. The second module 200 may rotate about the second rotation axis A2 in the state in which the second module 200 is connected to the other end of the link unit.

The first module 200 may rotate about the first rotation axis A1. For example, as shown in FIGS. 3A and 3B, the first rotation axis A1 may be a y-axis of a three-dimensional spatial coordinate. In this case, the first module 200 may rotate on an x-z plane about the y-axis as the rotation axis. When the first module 200 rotates about the first rotation axis A1, the height of the second module 200 may be adjusted.

The second module 200 may rotate about the second rotation axis A2. The second rotation axis A2 may be a rotation axis that traverses the first rotation axis A1. The configuration in which the first rotation axis A1 traverses the second rotation axis A2 means that the first rotation axis A1 and the second rotation axis A2 intersect each other. For example, as shown in FIGS. 3A and 3B, the second rotation axis A2 may be an x-axis of the three-dimensional spatial coordinate. In this case, the second module 200 may rotate on a y-z plane about the x-axis as the rotation axis. When the second module 200 rotates about the second rotation axis A2, the second module 200 may be disposed horizontally or vertically with respect to the seat cushion C.

FIG. 3A is a view illustrating a state in which the first module 200 and the second module 200 are positioned at the operation position. The arrows illustrated in FIG. 3A indicate the rotation direction of the first module 200 and the rotation direction of the first sector gear 120 when the armrest 10 moves from the operation position to the standby position. For example, as shown in FIG. 3A, the first sector gear 120 may rotate counterclockwise about the first rotation axis A1 at the operation position. The first module 200 connected to the first sector gear 120 may move from the operation position to the standby position by rotating counterclockwise about the first rotation axis A1 at the operation position. In other words, when the first module 200 rotates counterclockwise about the first rotation axis A1, the first module 200 may move so that the height thereof decreases with respect to the seat cushion C.

In addition, when the first module 200 rotates counterclockwise about the first rotation axis A1, the second module 200 may rotate about the second rotation axis A2 and thus be disposed vertically with respect to the seat cushion C. The structure in which the second module 200 rotates will be described below with reference to the drawings.

Alternatively, the first sector gear 120 may rotate clockwise about the first rotation axis A1 at the operation position. The first module 200 connected to the first sector gear 120 may move from the operation position to the standby position by rotating clockwise about the first rotation axis A1 at the operation position. In other words, when the first module 200 rotates clockwise about the first rotation axis A1, the first module 200 may move so that the height thereof decreases with respect to the seat cushion C. In addition, when the first module 200 rotates clockwise about the first rotation axis A1, the second module 200 may rotate about the second rotation axis A2 and thus be disposed vertically with respect to the seat cushion C. The structure in which the second module 200 rotates will be described below with reference to the drawings.

FIG. 3B is a view illustrating a state in which the first module 200 and the second module 200 are positioned at the standby position. The arrows illustrated in FIG. 3B indicate the rotation direction of the first module 200 and the rotation direction of the first sector gear 120 when the armrest 10 moves from the standby position to the operation position. As shown in FIG. 3B, the first sector gear 120 may rotate clockwise about the first rotation axis A1 at the operation position. The first module 200 connected to the first sector gear 120 may move from the standby position to the operation position by rotating clockwise about the first rotation axis A1 at the operation position. In other words, when the first module 200 rotates clockwise about the first rotation axis A1, the first module 200 may move so that the height thereof increases with respect to the seat cushion C.

In addition, when the first module 200 rotates clockwise about the first rotation axis A1, the second module 200 may rotate about the second rotation axis A2 and thus be disposed horizontally with respect to the seat cushion C.

Alternatively, the first sector gear 120 may rotate counterclockwise about the first rotation axis A1 at the operation position. The first module 200 connected to the first sector gear 120 may move from the standby position to the operation position by rotating counterclockwise about the first rotation axis A1 at the operation position. In other words, when the first module 200 rotates counterclockwise about the first rotation axis A1, the first module 200 may move so that the height thereof increases with respect to the seat cushion C.

In addition, when the first module 200 rotates counterclockwise about the first rotation axis A1, the second module 200 may rotate about the second rotation axis A2 and thus be disposed horizontally with respect to the seat cushion C.

As described above, the actuator 110 may provide the rotational force to the first sector gear 120 to rotate the first module 200.

The term "clockwise" or "counterclockwise" is used to explain the operation of the armrest 10 with reference to the drawings and should be considered as descriptive sense in one direction or the other direction, which is the rotation direction, instead of restrictive sense. Therefore, the rotation directions of the first module 200 and the second module 200, which move to the standby position or the operation position, are not limited to the clockwise or counterclockwise direction.

Figure 4A:
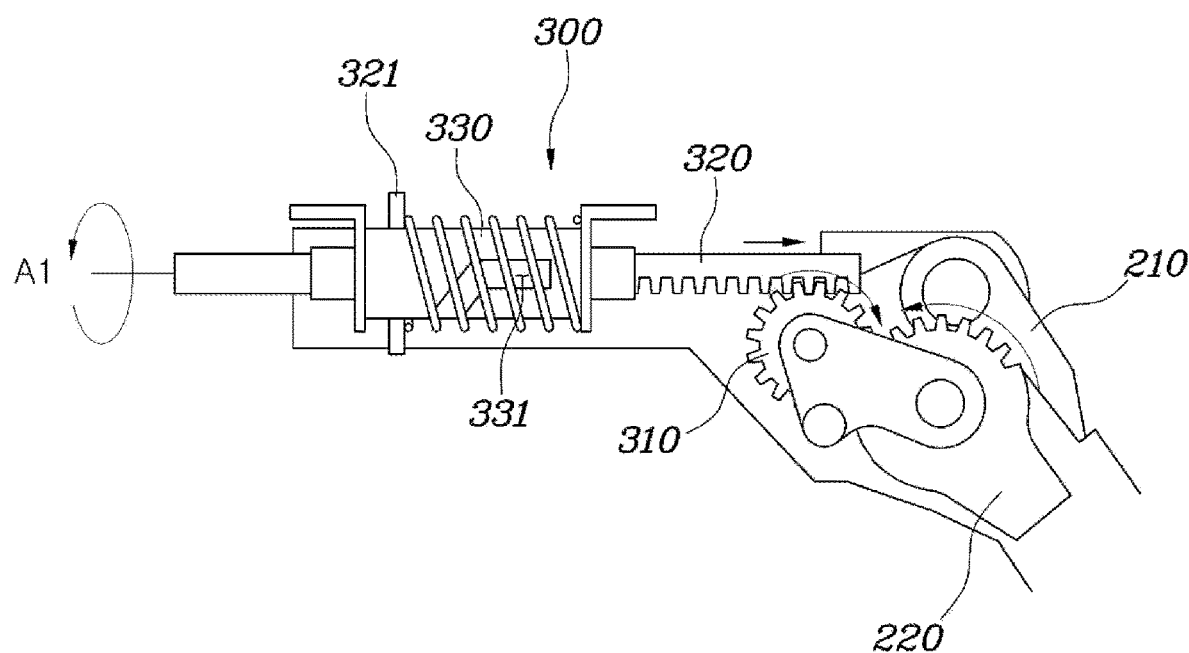
FIGS. 4A and 4B show a state in which a second module of the armrest according to an exemplary embodiment of the present invention rotates.
Figure 4B:
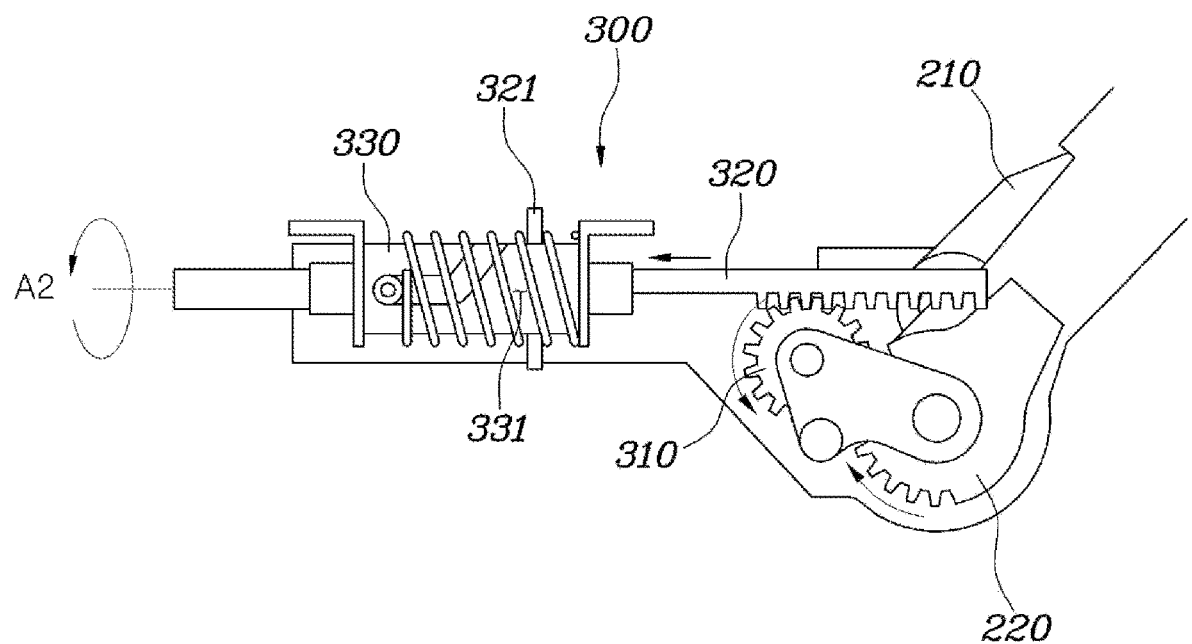

FIGS. 4A and 4B are views illustrating a state in which the second module of the armrest according to the embodiment rotates.

As shown in FIGS. 4A and 4B, the first module 200 may include a second sector gear connected to the second module 200. The second sector gear may be provided at the other end of the link unit.

The second sector gear may be operated as the first module 200 rotates. When the first module 200 rotates about one end of the link unit as the rotation center, the other end of the link unit moves while drawing an arc, such that the second sector gear may be operated. In other words, the second sector gear is not rotated by itself but may be operated indirectly as the link unit moves in a circumferential direction.

The second module 200 may include a pinion gear 310 rotatably connected to the second sector gear, and a rack gear 320 configured to engage with gear teeth of the pinion gear 310 and move forward or rearward. When the second sector gear operates, the pinion gear 310 may be rotated by the second sector gear. When the pinion gear 310 rotates, the rack gear 320 may move forward or rearward by means of an engagement relationship with the pinion gear 310. As the rack gear 320 moves forward or rearward, the second module 200 may rotate about the second central axis. The term "forward" or "rearward" means a front of rear side of the seat S.

The rack gear 320 may include a guide pin 321 and a rotary member 330. The guide pin 321 may be spaced apart from a point, at which the rack gear 320 is connected to the pinion gear 310, at a predetermined distance in a direction in which the rack gear 320 extends. A part of the rack gear 320 may be inserted into the rotary member 330. The guide pin 321 may be inserted by penetrating the rotary member 330, from inside to outside the rotary member 330, through a guide groove 331 formed in the rotary member 330.

At least a part of the guide groove 331 formed in the rotary member 330 may be curved along an outer peripheral surface of the rotary member 330. Two opposite ends of the guide groove 331 each have a straight shape having a predetermined length, and the guide groove 331 may be curved from the two opposite ends to the center thereof. For example, a central portion of the guide groove 331 may have, but not limited to, an 'S' shape.

When the rack gear 320 moves forward or rearward, the guide pin 321, which penetrates the rotary member 330 from inside to outside, may move along the guide groove 331. In other words, the guide groove 331 may guide the movement of the guide pin 321. Since at least a part of the guide groove 331 is curved, the guide pin 321 may rotate the rotary member 330 about the second rotation axis A2 by moving along the curved portion of the guide groove 331. In particular, the guide pin 321 may rotate the rotary member 330 by moving along the guide groove 331. As a result, when the second module 200 rotates about the second rotation axis A2, the second module 200 may be disposed horizontally or vertically with respect to the seat cushion C.

FIG. 4A shows the second module 200 at the operation position. The arrows illustrated in FIG. 4A indicate the operation direction of the second sector gear, the rotation direction of the pinion gear 310, and the movement direction of the rack gear 320 when the armrest 10 moves from the operation position to the standby position.

As shown in FIG. 4A, the second sector gear may operate clockwise when the first module 200 moves from the operation position to the standby position. The pinion gear 310 connected to the second sector gear may rotate counterclockwise by means of an engagement relationship with the second sector gear, and the rack gear 320 connected to the pinion gear 310 may move rearward. When the rack gear 320 moves rearward, the guide pin 321 moves along the guide groove 331, such that the rotary member 330 may rotate about the second rotation axis A2. Therefore, when a height of the first module 200 with respect to the seat cushion C decreases, the second module 200 may rotate so as to be disposed vertically with respect to the seat cushion C. Consequently, since the second module 200 is disposed vertically with respect to the seat cushion C at the standby position, the second module 200 may occupy a minimum space.

FIG. 4B shows the second module 200 at the standby position. The arrows illustrated in FIG. 4B indicate the operation direction of the second sector gear, the rotation direction of the pinion gear 310, and the movement direction of the rack gear 320 when the armrest 10 moves from the standby position to the operation position.

For example, as shown in FIG. 4B, the second sector gear may operate counterclockwise when the first module 200 moves from the operation position to the standby position. In this case, the pinion gear 310 connected to the second sector gear may rotate clockwise by means of the engagement relationship with the second sector gear, and the rack gear 320 connected to the pinion gear 310 may move forward. When the rack gear 320 moves forward, the guide pin 321 moves along the guide groove 331, such that the rotary member 330 may rotate about the second rotation axis A2. Therefore, when the height of the first module to 200 with respect to the seat cushion C increases, the second module 200 may rotate so as to be disposed horizontally with respect to the seat cushion C.

As shows in FIGS. 3A to 4B, the driving power generated by the base 100 of the armrest 10 according to exemplary embodiments of the present invention may be transmitted to the first module 200, the first module 200 may rotate, and the second module 200 may rotate. The first module 200 may rotate about the first rotation axis A1, and the second module 200 may be rotated about the second rotation axis A2 by the rotational motion of the first module 200. Therefore, the rotational structures of the base 100, the first module 200, and the second module 200 may be associated with one another, thereby defining a four-joint link. Consequently, the first module 200 and the second module 200 may rotate about different central axes on different planes.

Figure 5:
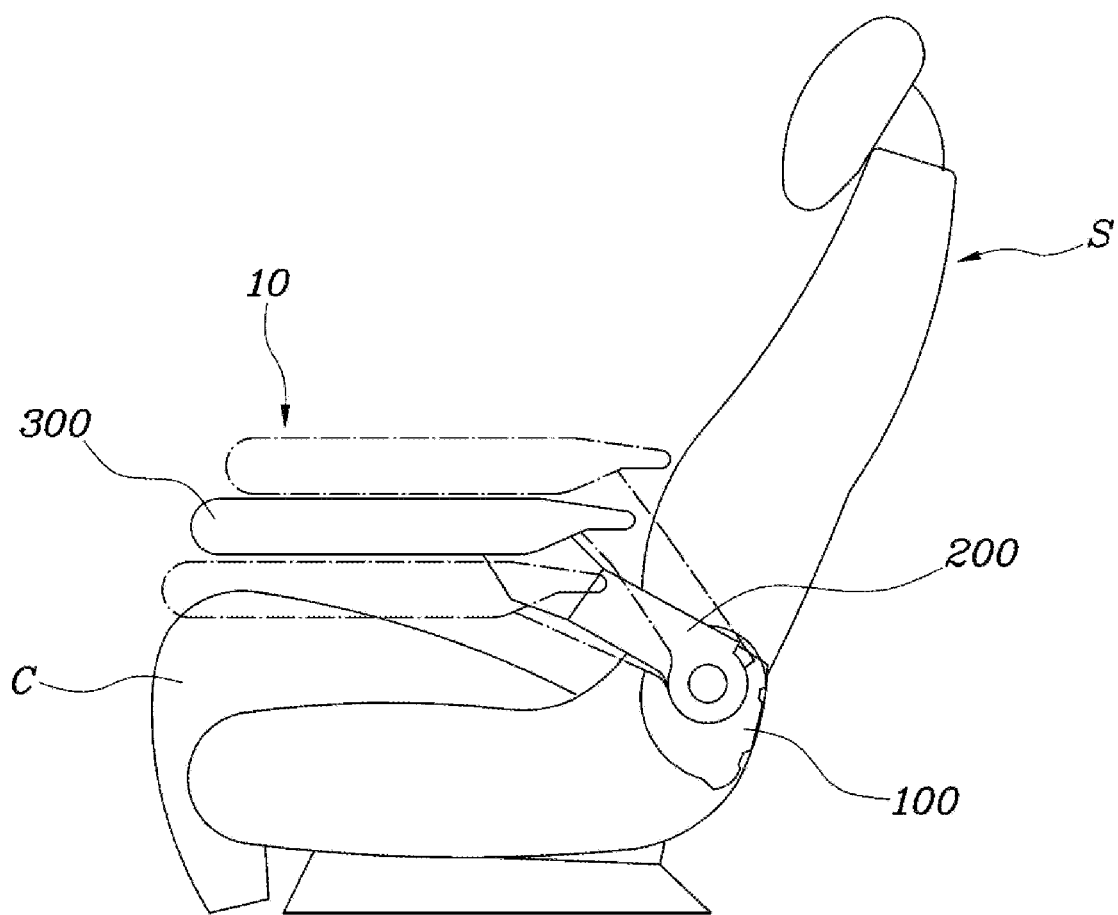
FIG. 5 shows a state in which a height of the armrest according to an exemplary embodiment of the present invention is adjusted.

FIG. 5 shows a state in which a height of the armrest according to an exemplary embodiment of the present invention is adjusted.

As shown in FIG. 5, according to the armrest 10 according to the embodiment, the height of the second module 200 with respect to the seat cushion C may be adjusted as the first module 200 rotates relative to the base 100. In other words, the armrest 10 is not fixed at the operation position. Even when the armrest 10 is positioned at the operation position, the first module 200 may rotate by a predetermined angle, such that the height of the second module 200 with respect to the seat cushion C may be adjusted. The occupant may appropriately adjust the position of the armrest 10 depending on a body structure or a seating posture of the occupant. Therefore, the occupant seated in the seat S may take a most comfortable posture.

When an initial position at which the armrest 10 is moved from the standby position to the operation position is referred to as a reference position (solid lines in FIG. 5), the second module 200 may be positioned at a height of about 175 mm with respect to the seat cushion C. The occupant is seated in the seat and then rotates the first module 200 by a predetermined angle with respect to the base 100, thereby adjusting the height of the second module 200 depending on the body structure or the seating posture.

For example, when the first module 200 rotates clockwise by about 7.5 degrees at the reference position, the second module 200 may be positioned at a height of about 155.5 mm with respect to the seat cushion C. The second module 200 may move to a position lower by about 19.5 mm than when the second module 200 is positioned at the reference position.

In addition, when the first module 200 rotates counter-clockwise by about 7.5 degrees at the reference position, the second module 200 may be positioned at a height of about 192 mm with respect to the seat cushion C. Therefore, the second module 200 may move to a position higher by about 17 mm than when the second module 200 is positioned at the reference position.

The operating range of the armrest 10 is not limited to the above-mentioned numerical values but may be changed depending on the size and arrangement structure of the armrest 10.

Figure 6:
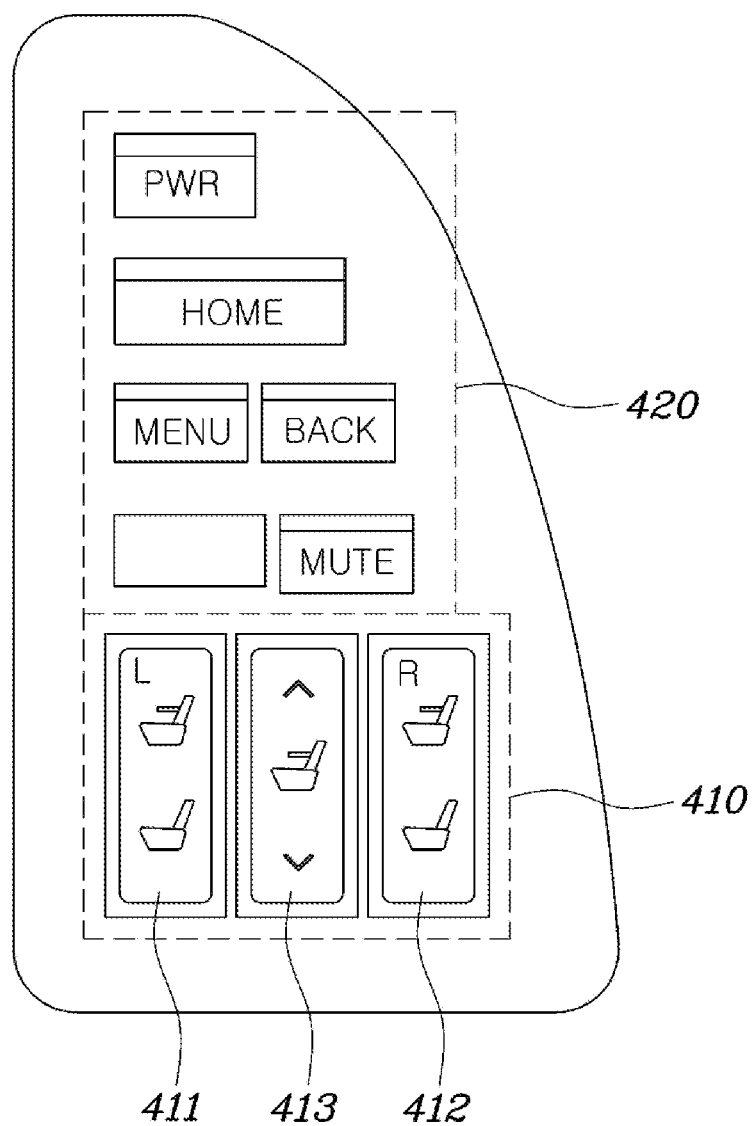
FIG. 6 shows an exemplary controller of the armrest according to an exemplary embodiment.

FIG. 6 shows an exemplary controller of the armrest according to an exemplary embodiment of the present invention.

The occupant may appropriately adjust the position of the armrest 10 by manipulating the controller 400 illustrated in FIG. 6. As shown in FIG. 6, the controller 400 may include an armrest operating unit 410 configured to adjust the position of the armrest 10, and a console operating unit 420 configured to manipulate various devices such as electrical components, an air conditioning system, lights, speakers, and the like of the vehicle.

The controller 400 may include a first operating unit 411 or 412 configured to operate to position the armrest 10 at the standby position or the operation position, and a second operating unit 413 configured to adjust the position of the armrest 10 at the operation position.

Since the armrests 10 are disposed at the two opposite sides of the seat, the first operating unit may include a left armrest operating unit 411 configured to manipulate the left armrest 10, and a right armrest operating unit 412 configured to manipulate the right armrest 10.

The armrest 10 may be positioned at the standby position before the occupant is seated in the seat S. When the occupant is seated in the seat S and then touches the first operating unit 411 or 412, the surface armrest 10 may move to the operation position. In particular, the armrest 10 may be positioned at the reference position described as shown in FIG. 5. The left armrest 10 may move to the reference position when the occupant touches the left armrest operating unit 411, and the right armrest 10 may move to the reference position when the occupant touches the right armrest operating unit 412. Therefore, the controller 400 may be operated in a one-touch manner.

When the armrest 10 is moved to the operation position, the occupant may adjust the height of the second module 200 by manipulating the second operating unit 413. When the occupant touches an upper side of the second operating unit 413, the first module 200 may rotate so that the height of the second module 200 with respect to the seat cushion C increases. Likewise, when the occupant touches a lower side of the second operating unit 413, the first module 200 may rotate so that the height of the second module 200 with respect to the seat cushion C decreases. The controller 400 may include auxiliary symbols so that a user may intuitively understand the manipulation method without a special effort.

Figure 7:
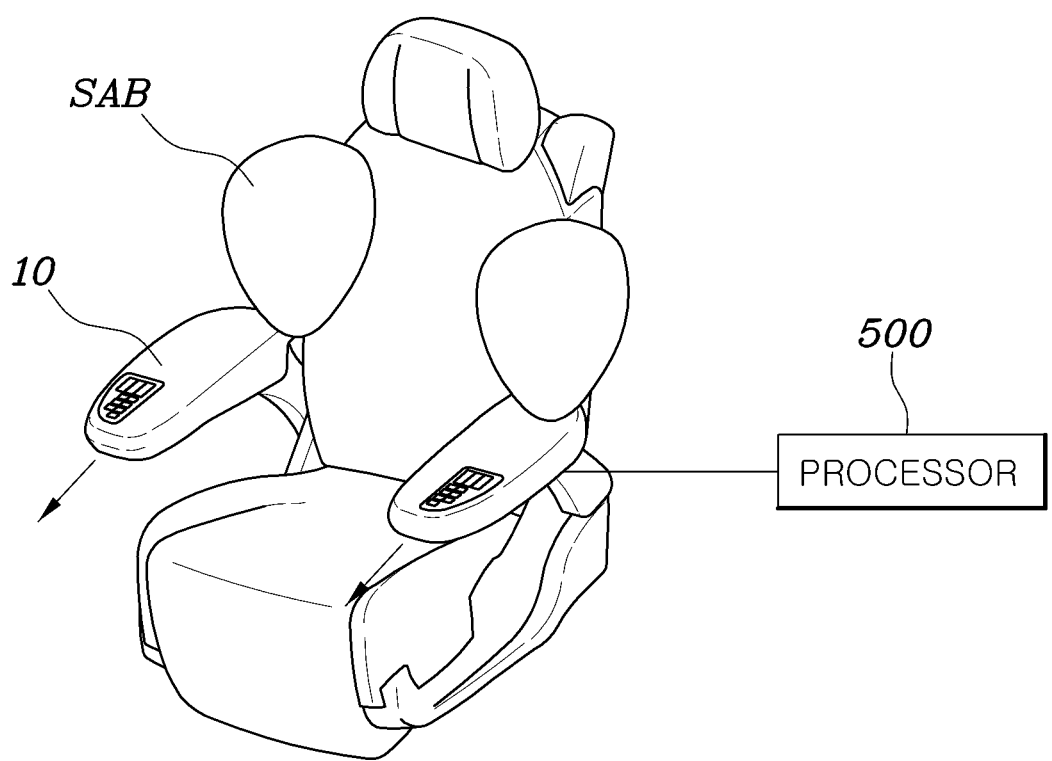
FIG. 7 shows an operation of the armrest according to an exemplary embodiment of the present invention in a state in which an airbag is deployed.

FIG. 7 shows an exemplary operation of the armrest according to an exemplary embodiment of the present invention in a state in which an airbag is deployed.

As shown in FIG. 7, the armrest 10 may include a processor 500 configured to adjust the position of the armrest 10. The processor 500 may control the operation of the actuator 110. When the processor 500 transmits an electrical signal to the actuator 110, the actuator 110 may provide the rotational force to the first module 200 depending on the electrical signal, thereby rotating the first module 200. Therefore, the processor 500 may adjust the position of the armrest 10.

When the vehicle detects a collision risk or a collision occurs, the side airbag SAB may be deployed at the lateral side of the seat to protect the occupant. The side airbag SAB may be provided in a roof, a pillar, or a door of the vehicle or may be embedded in the seat S.

When the armrest 10 is positioned at the operation position, the armrest 10 may be positioned at a position at which the side airbag SAB is deployed. The armrest 10 may act as an obstacle when the side airbag SAB is deployed. In a situation in which the side airbag SAB is not appropriately deployed because of the armrest 10, the side airbag SAB cannot properly perform the function of protecting the occupant from impact.

The processor 500 may adjust the position of the armrest 10 so that the armrest 10 moves forward relative to the seat S when the side airbag SAB is deployed. Hereinafter, a method of adjusting, by the processor 500, the position of the armrest 10 will be described with reference to FIG. 8.

Figure 8:
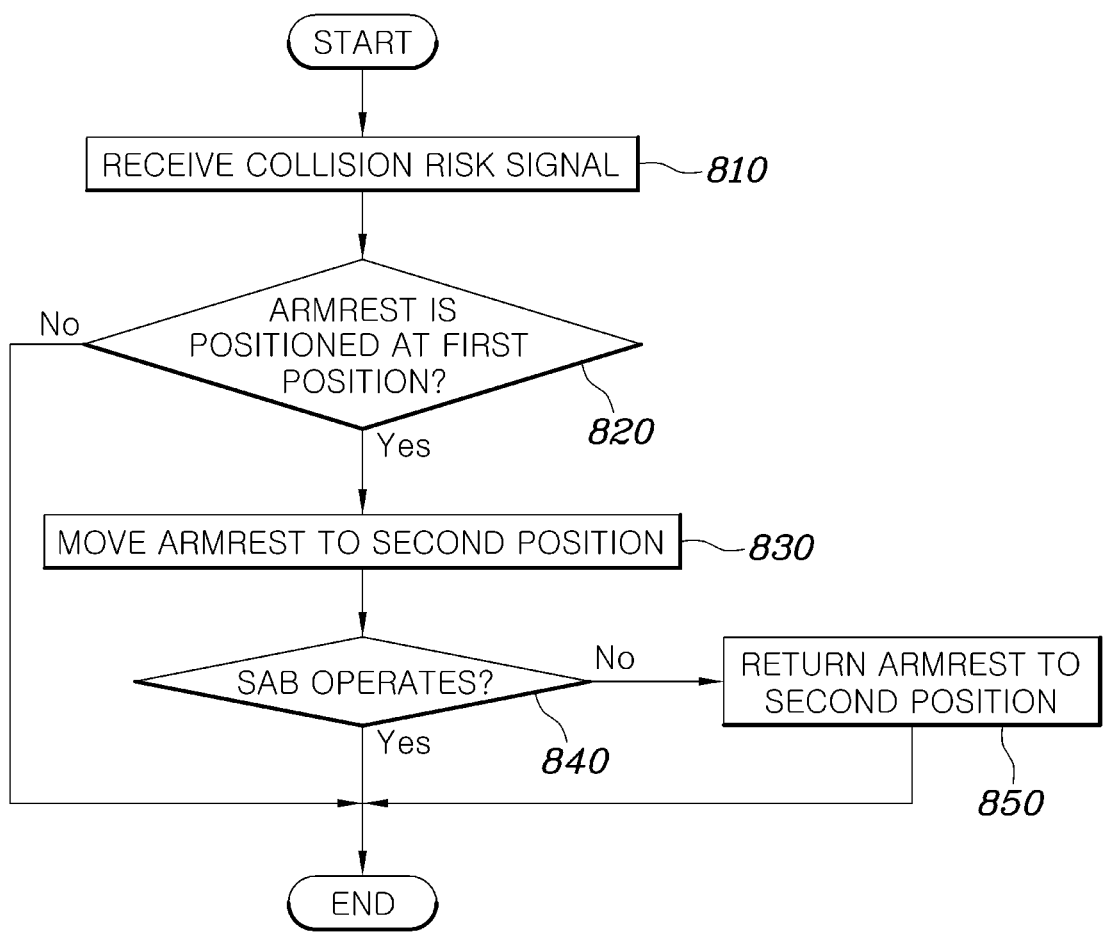
FIG. 8 shows an operation of the armrest according to an exemplary embodiment of the present invention.

FIG. 8 shows an exemplary operation of the armrest according to an exemplary embodiment of the present invention.

As shown in FIG. 8, in step 810, the processor 500 receives a collision risk signal. The vehicle may include a collision detection sensor, such as a vision sensor, an ultrasonic sensor, a lidar sensor, or a radar sensor, for detecting a collision. When the collision detection sensor detects a collision risk, the collision detection sensor may transmit a collision risk signal to the processor 500, and the processor 500 may receive the collision risk signal.

In step 820, the processor 500 may determine whether the armrest 10 is positioned at a first position. The first position may be a position of the armrest 10 at which a sufficient space for the deployment of the side airbag SAB is not ensured. For example, the first position may be a position at which a distance from the seatback to the armrest 10 is equal to or shorter than a preset distance.

In step 830, when the armrest 10 is positioned at the first position, the processor 500 may adjust the position of the armrest 10 to a second position. In other words, the armrest 10 may move to the second position. The second position may be a position of the armrest 10 at which a sufficient space for the deployment of the side airbag SAB is ensured. For example, the second position may be a position at which the armrest 10 is maximally spaced apart from the seatback. The processor 500 may transmit a driving signal to the actuator 110 to position the first module 200 at a position maximally spaced apart from the seatback. For example, the processor 500 may rotate the first module 200 at the reference position by about 12.5 degrees.

In step 840, the processor 500 may determine whether the side airbag SAB is operated. Whether the side airbag SAB is operated means whether the side airbag SAB is deployed.

In step 850, when the side airbag SAB is not operated, the processor 500 may adjust the position of the armrest 10 to the first position. In other words, the armrest 10 may return to the first position. The case in which the side airbag SAB is not operated may be a situation in which no collision actually occurs even though the collision risk is detected. Therefore, the armrest 10 may move to the first position which is an original position.

Figure 10A:
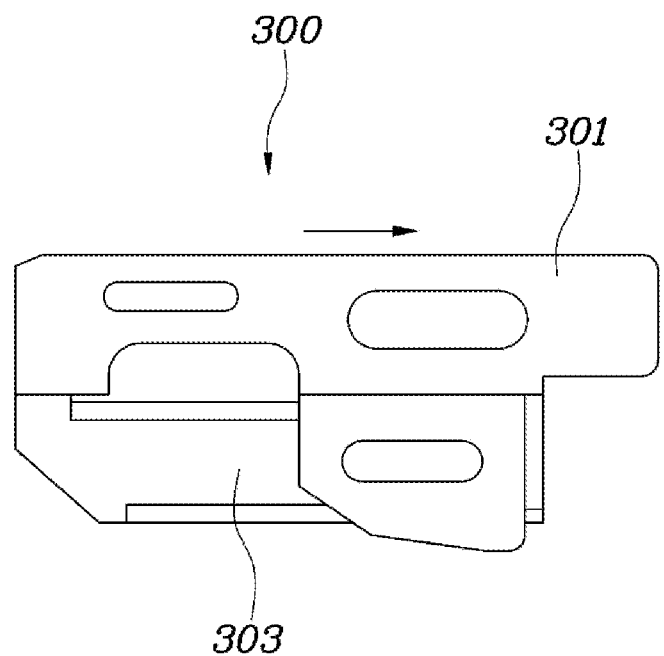
Figure 10B:
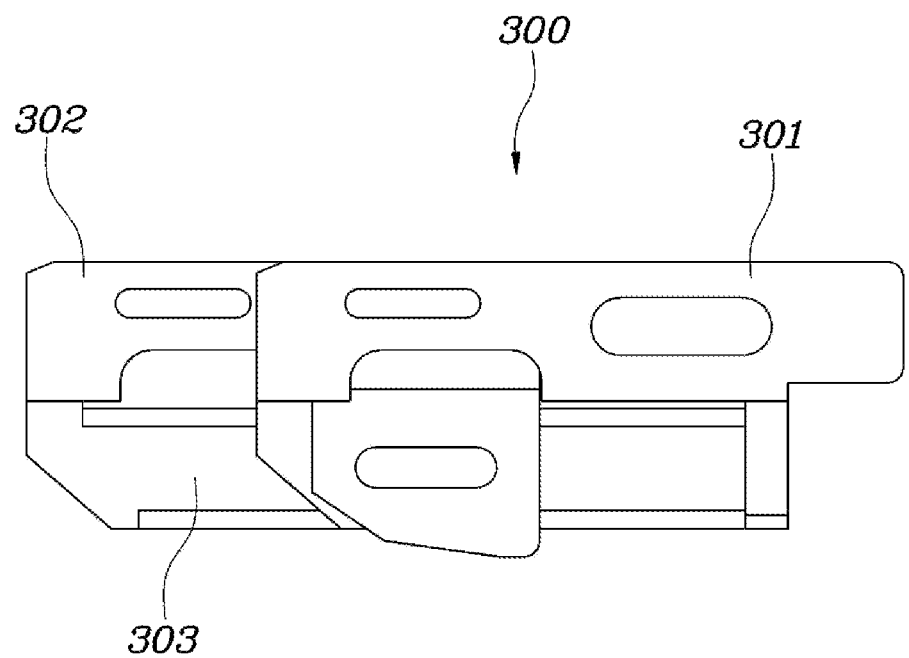

FIGS. 9, 10A, and 10B show an operation of the armrest according to an exemplary embodiment of the present invention in a relaxing mode of a seat.

As shown in FIG. 9, an occupant H seated in the seat S may use a relaxing mode by rotating the seatback rearward so that an angle between the seatback and the seat cushion C increases. Since the angle between the seatback and the seat cushion C increases in the relaxing mode, the occupant H may take a rest in a supine posture. A position of an elbow of the occupant H when the occupant H lies on the seat S may be different from a position of the elbow when the occupant H is seated in the seat S. Therefore, it is necessary to adjust the position of the armrest 10 so that the occupant H is kept in a comfortable posture in the relaxing mode.

The second module 200 of the armrest 10 may include an upper housing 301 and a lower housing 302. The upper housing 301 may be connected to the lower housing 302 so as to be slidable forward or rearward.

As shown in FIG. 10A, the upper housing 301 and the lower housing 302 may overlap each other. The state illustrated in FIG. 10A may be a state of the second module 200 in a state in which the seat S is not in the relaxing mode.

When the seat S is in the relaxing mode, the upper housing 301 may slide rearward relative to the lower housing 302. The lower housing 302 may include a guide rail 303 on which the upper housing 301 slides. As the upper housing 301 slides rearward along the guide rail 303, the position of the second module 200 may be moved rearward. Therefore, when the seat S is in the relaxing mode, the occupant may move the second module 200 rearward and place his/her arm on the second module 200. For example, the second module 200 may slide forward or rearward by about 110 mm.

Meanwhile, to slide the upper housing 301 rearward relative to the lower housing 302, the occupant may apply an external force to the upper housing 301 or the occupant may manipulate the controller 400.

It can be understood that those skilled in the art in the technical field related to the present embodiments can implement modifications without departing from the intrinsic characteristics of the present invention. Therefore, the disclosed methods need to be considered as being illustrative but not restrictive. The scope of the present invention is defined by claims instead of the above-mentioned description, and all the differences in the equivalent scope thereto should be construed as falling within the scope of the present invention.

DESCRIPTION OF REFERENCE NUMERALS

10: Armrest
100: Base
110: Actuator
120: First sector gear
200: First module
210: Link unit
220: Second sector gear
300: Second module
301: Upper housing
302: Lower housing
303: Guide rail
310: Pinion gear
320: Rack gear
321: Guide pin
330: Rotary member
331: Guide groove
400: Controller
411, 412: First operating unit
413: Second operating unit
500: Processor

What is claimed is:

1. An armrest for a seat, which is accommodated at a lateral side of a seat cushion at a standby position and adjusted in height with respect to the seat cushion at an operation position, the armrest comprising:
   a base disposed adjacent to the seat cushion;
   a first module rotatably connected to the base and configured to rotate about a first rotation axis so that a height of the first module with respect to the seat cushion is adjusted; and
   a second module rotatably connected to the first module and configured to rotate about a second rotation axis traversing the first rotation axis so that the second module is disposed horizontally or vertically with respect to the seat cushion.

2. The armrest of claim 1, wherein when the first module rotates about the first rotation axis in one direction, the second module is rotated about the second rotation axis and disposed horizontally with respect to the seat cushion, and
   wherein when the first module rotates about the first rotation axis in the other direction, the second module is rotated about the second rotation axis and disposed vertically with respect to the seat cushion.

3. The armrest of claim 1, wherein the base comprises a first sector gear connected to the first module, wherein when the first sector gear rotates about the first rotation axis in one direction, the first module moves so that a height thereof with respect to the seat cushion increases, and wherein when the first sector gear rotates about the first rotation axis in the other direction, the first module moves so that the height thereof with respect to the seat cushion decreases.

4. The armrest of claim 3, wherein the base comprises an actuator configured to provide driving power to the first sector gear.

5. The armrest of claim 1, wherein the first module comprises a link unit, one end of the link unit is connected to the base so as to be rotatable about the first rotation axis and serves as a rotation center, and the other end of the link unit is connected to the second module.

6. The armrest of claim 5, wherein the second module is connected to the other end of the link unit so as to be rotatable about the second rotation axis.

7. The armrest of claim 1, wherein the first module comprises a second sector gear connected to the second module and configured to operate when the first module rotates, wherein the second module comprises a pinion gear rotatably connected to the second sector gear, and a rack gear configured to engage with the pinion gear and move forward or rearward relative to the seat, and wherein the second module is rotated about the second rotation axis by the forward or rearward movement of the rack gear.

8. The armrest of claim 7, wherein the pinion gear rotates in the other direction when the second sector gear operates in one direction, and the pinion gear rotates in one direction when the second sector gear operates in the other direction, such that the rack gear moves forward or rearward relative to the seat.

9. The armrest of claim 7, wherein the rack gear comprises a guide pin, wherein the second module comprises a rotary member into which a part of the rack gear is inserted, the rotary member comprising a guide groove penetrated by the guide pin from inside to outside, wherein at least a part of the guide groove is curved along an outer peripheral surface of the rotary member, and wherein when the rack gear moves forward or rearward, the guide pin moves along the guide groove to rotate the rotary member about the second rotation axis.

10. The armrest of claim 1, wherein a height of the second module with respect to the seat cushion is adjusted as the first module rotates relative to the base.

11. The armrest of claim 1, further comprising:
a controller comprising:
a first operating unit configured to position the armrest at the standby position or the operation position; and
a second operating unit configured to adjust a position of the armrest at the operation position.

12. The armrest of claim 1, further comprising:
a processor configured to adjust a position of the armrest,
wherein the processor adjusts the position of the armrest so that the armrest moves forward relative to the seat when an airbag embedded in the seat is deployed.

13. The armrest of claim 12, wherein the processor adjusts the position of the armrest to move the armrest forward relative to the seat when processor receives a collision risk signal, and wherein the processor adjusts the position of the armrest to move the armrest to an original position when a side airbag is not deployed after the processor receives the collision risk signal.

14. The armrest of claim 1, wherein the second module comprises an upper housing and a lower housing disposed below the upper housing, and the upper housing is connected to the lower housing so as to be slidable rearward to adjust a position of the second module forward or rearward.

15. A vehicle comprising an armrest of claim 1.

* * * * *